Dec. 6, 1966     D. M. JACOB     3,290,677

CONTINUOUS WAVE ANGLE AND RANGE DETERMINING RADAR

Filed Dec. 31, 1962     5 Sheets-Sheet 1

DON M. JACOB
INVENTOR.

BY *[signature]*
AGENT

Dec. 6, 1966     D. M. JACOB     3,290,677
CONTINUOUS WAVE ANGLE AND RANGE DETERMINING RADAR
Filed Dec. 31, 1962     5 Sheets-Sheet 4

DON M. JACOB
INVENTOR.

BY
AGENT

United States Patent Office 3,290,677
Patented Dec. 6, 1966

3,290,677
CONTINUOUS WAVE ANGLE AND RANGE
DETERMINING RADAR
Don M. Jacob, Los Angeles, Calif., assignor, by mesne assignments, to TRW Inc., a corporation of Ohio
Filed Dec. 31, 1962, Ser. No. 248,357
15 Claims. (Cl. 343—10)

This invention relates generally to a cooperative system employing a continuous wave (CW) radar, a transponder and, particularly, to a system for docking two objects together.

The disclosed system is particularly adaptable for use in outer space due to the light weight, high accuracy, low power requirements and lack of moving parts. These same features also make the invention desirable for earth bound activities, such as aircraft detection, aircraft landing systems and in other nonrelated fields as long range surveying.

The preferred embodiment is described in connection with an X-band radar located on a first object and having means for high accuracy tracking of the transponder at very long and very short ranges. The transponder may be located on a second object such as another moving vehicle or emplaced on a substantially fixed object such as the moon or another planet. Both the radar and the beacon make use of the injected reference technique that is more fully described and claimed in copending application, Serial No. 237,229, filed November 13, 1962, and assigned to the same common assignee. The injected reference technique has distinct advantages for high ranging accuracy and great system flexibility since the injected reference signal allows a high degree of stability in a phase tracking receiver and circumvents the "zero-set" problem which arises because of drifts in receiver delay time with variations in temperature and signal strength.

The basic idea of the injected reference system is to track an incoming signal by injecting, prior to any RF filtering, an RF signal derived from tracking oscillators. The incoming signal consists of a carrier and a ranging sideband that is tracked by injecting an identical signal maintained at a displacement of approximately 30 kc. relative to the incoming signal. An offset frequency of 30 kc. was used on the 400 mc. receiver described in the copending application. The offset frequencies for the preferred X-band system are 32 kc. for the transponder and 38 kc. for the radar. The injected reference and incoming signal are reduced to an intermediate frequency (IF) more suitable for amplification by present day solid-state devices by means of a separate stable local oscillator (STALO) in both the radar and the transponder.

The carrier and sideband signals are separated by filtering at the lower intermediate frequencies and individually tracked in separate channels. A detector on the output of each channel IF amplifier detects the frequency offset between the carrier or sideband being tracked and the associated injected reference. Consequently, the channel IF amplifier detector actually serves the purpose of a mixer, and the injected reference serves as local oscillator power in the second mixer. The resulting signal is filtered and applied to a limiter-amplifier which provides most of the receiver gain. The output of the limiter-amplifier is phase detected in both the carrier and subcarrier channels against a common reference oscillator which establishes the frequency offset of the injected reference signal.

The output of the phase detector in the carrier channel is applied to a voltage-controlled oscillator (VCO) through an appropriate compensation network and amplifier. The output of the carrier VCO after frequency multiplication becomes the carrier injected reference.

The signal from the phase detector of the sideband channel is used similarly to control a VCO which runs at the ranging modulation frequency. The output of this VCO is used to modulate the injected reference carrier to generate the injected reference sideband.

The phase stable feature of the tracking receiver consists first of establishing the phase information on the offset frequency of approximately 38 kc. prior to passage through filters and amplifiers. Secondly, the injected reference signal in the IF amplifiers establishes the operating power level in the IF amplifiers so that the power level in the IF is essentially constant for the dynamic range of incoming signals. Since the phase reference is established at the offset frequency of approximately 38 kc., a time delay which would cause a phase shift of 105 degrees in the 4 mc. modulation (the modulation frequency employed in this radar) now causes only 1 degree phase shift.

The transponder is a simplified version of the basic radar configuration since the peripheral acquisition and data extraction circuitry are eliminated. The transponder performs modulation phase tracking of the received carrier and subcarrier signals; and aside from the basic transmitter, modulator, and tracking loops, the only peripheral circuitry required is for a carrier lock-on detection circuit. The carrier frequency transmitted by the transponder is different from the carrier frequency transmitted by the radar to eliminate ambiguities in transmitting and receiving information.

Further objects and advantages will be made more apparent by referring now to the accompanying drawings wherein.

The invention is concerned with a complete solid-state cooperative radar system operating at X-band and, particularly, useful for space rendezvous and docking. The use of solid-state techniques leads to a most reliable system having low weight and low power consumption. No moving parts are required in the system and simplicity is achieved by combining all required functions into a single X-band radar. While described for X-band, the system is quite adaptable to any transmitted frequency.

The described system exhibits an extremely high accuracy range readout (in the order of a foot) that has no minimum range limitation. Fine range data resolution is obtained by measuring the phase of a 4 mc. subcarrier that is sent to a transponder and coherently transmitted back to the radar. The 4 mc. phase stability is achieved by phase stabilization techniques in which the carrier and subcarrier signals are tracked along with an injected reference in two separate narrowband receivers, as described and claimed in the reference copending application.

The 4 mc. subcarrier in the present invention is obtained by modulating, and preferably amplitude modulating, the transmitted signal with a 4 mc. modulation signal, recognizing that other modulation techniques could be used. The same 4 mc. signal is also used to modulate the injected reference signal which tracks the phase of the incoming signal plus its 4 mc. subcarrier.

Angle tracking is achieved by employing an interferometer principle which essentially keeps track of the phase variation of an incoming signal between three receiving antennas located at right angles to each other. A phase difference in the received signal at the three antennas provides the necessary angle tracking information.

Figure 1:
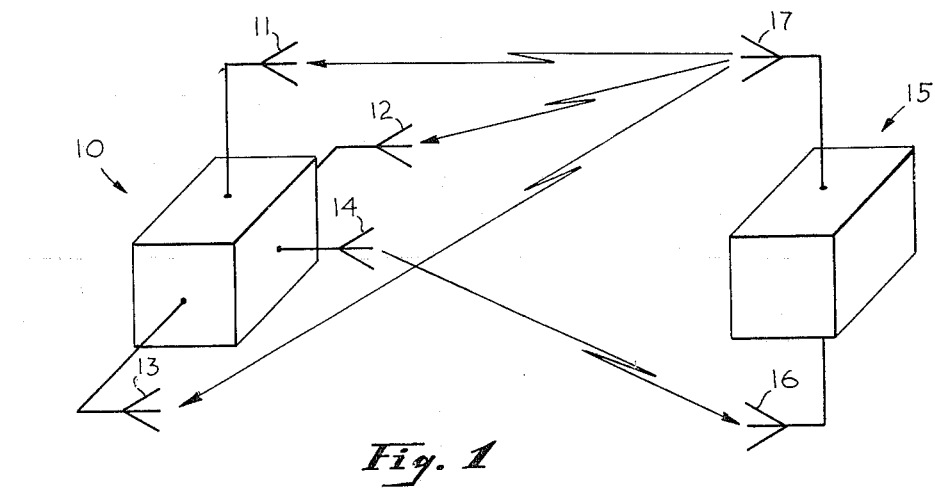
FIG. 1 is a block diagram illustrating the basic implementing in rendezvousing and/or docking a first object having a radar with a second object having a transponder.

Referring now to FIG. 1, there is shown a first object 10 containing a radar having three receiving antennas 11, 12, and 13, and a transmitting antenna 14. The three antennas 11, 12, and 13 are connected in circuit as an interferometer to measure the phase difference in the received signal appearing at each antenna. A second object 15 contains a transponder for receiving and coherently transmitting a signal by means of a receiving antenna 16 and a transmitting antenna 17. In operation the first object 10 transmits a continuous wave (CW) signal from antenna 14 to the second object 15 which receives the signal by antenna 16. The second object 15 coherently transmits a signal from antenna 17 back to the first object 10 with a frequency that is phase coherent with the received signal.

Figure 2:
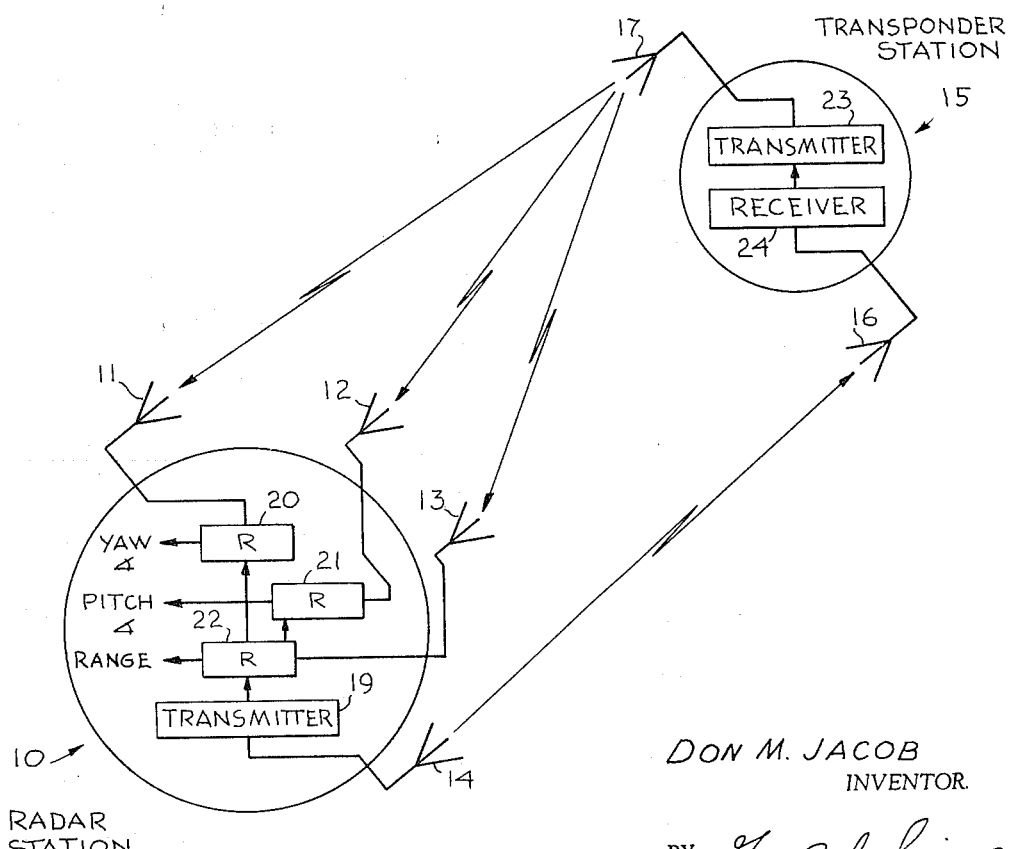
FIG. 2 illustrates the components comprising the radar station and the transponder of FIG. 1.

Referring now to FIG. 2, there is shown a block diagram of the radar station in the first object 10 comprising a continuous wave Doppler transmitter 19 and a plurality of receivers 20, 21, and 22. The continuous wave Doppler transmitter 19 is arranged to transmit a CW signal to the transponder in the second object 15. The transponder may be located in a satellite, missile, or simply parachuted to ground and used as a homing beacon. The transponder comprises a transmitter 23 and a receiver 24 for transmitting a carrier signal from antenna 17 that is phase coherent with the received signal at antenna 16. Antennas 11, 12, and 13 are adapted to receive the carrier signal from the transponder. Receivers 20, 21, and 22 measure the phase difference at the antennas of the received signal to determine angle information. The modulation signal applied to the carrier signal transmitted from antenna 14 is also applied to receiver 22 in order to obtain range information. The phase change measured by receivers 20, 21, and 22 is an indication of the relative movement between the first object 10 and the second object 15. The three receivers in this configuration are known as an interferometer and by themselves will produce sufficient information to determine yaw and pitch bearing angles. The combination of the transmitter 19 with any of the receivers will produce ranging information which together with the range difference or angle information from the three receivers connected as an interferometer, will be sufficient to track an object in space.

Figure 3:
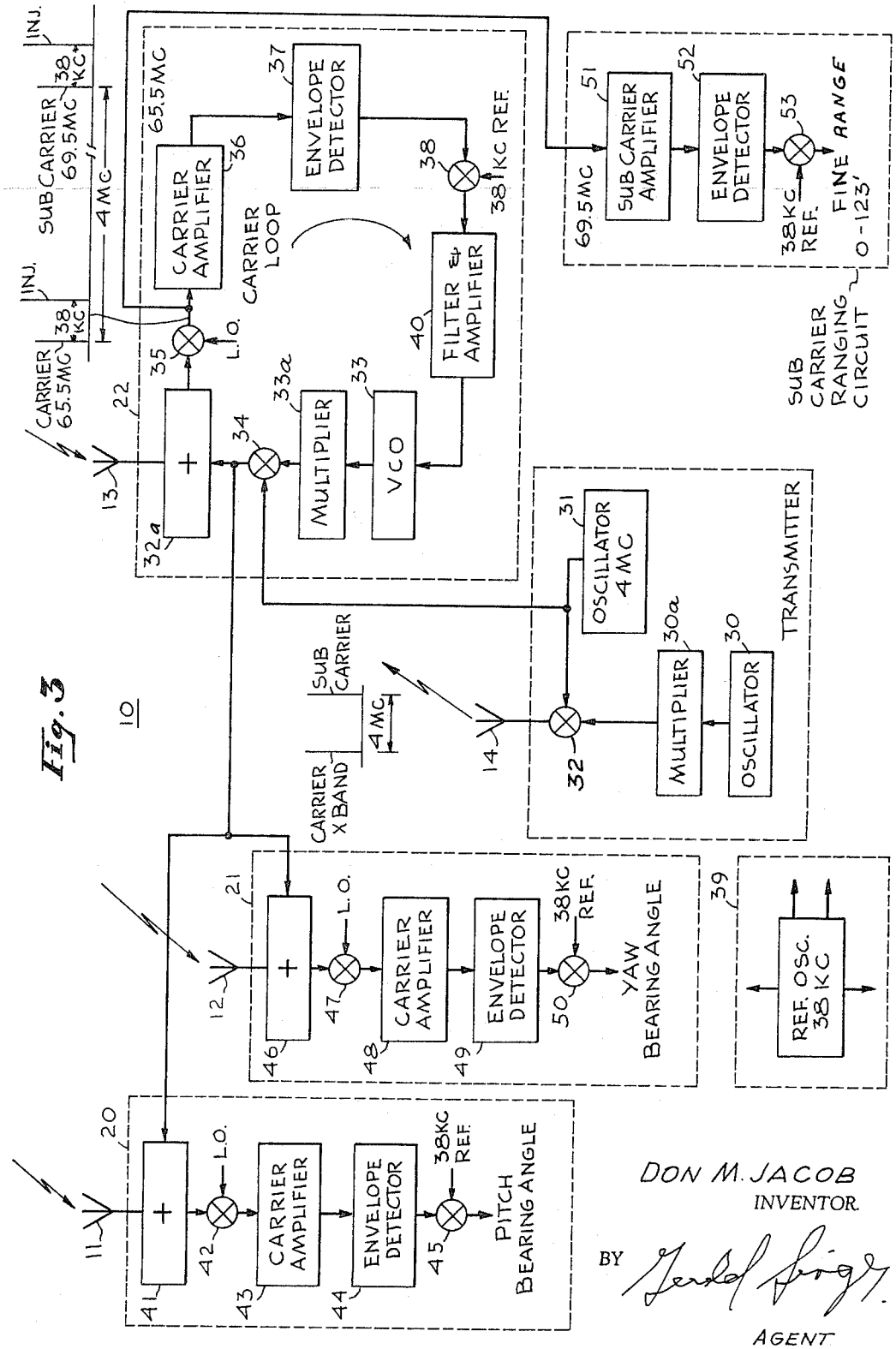
FIG. 3 is a functional block diagram of the radar station illustrated in FIG. 1 and FIG. 2.

Referring now to FIG. 3, there is shown a simplified block diagram of the complete radar system for obtaining angle information and ranging information. The carrier signal in the preferred embodiment is an X-band signal which is approximately 10,000 mc. that is modulated by a 4 mc. signal for producing a sideband having a frequency of the X-band plus 4 mc. The system to be described is capable of determining the angle bearings to an accuracy which is dependent only on the X-band frequency. The ranging information is obtained from the 4 mc. subcarrier signal and, hence, is capable of producing unambiguous range for only one wavelength of the 4 mc. signal which is approximately 123 feet. The carrier signal in the radar is generated by means of an oscillator 30 at a substantially low frequency signal of approximately 5 mc. and is multiplied in a varactor multiplier 30a to the X-band frequency for transmission from antenna 14. The subcarrier is generated by means of a 4 mc. oscillator 31 which modulates the carrier signal in a suitable modulator 32, thereby generating an X-band carrier signal with a 4 mc. subcarrier. The carrier and subcarrier signals are transmitted from the radar station to the transponder in the second object 15 where the received signals are coherently transmitted to the first object 10 in the same phase relationship as received. Details of the transponder will be more fully described in connection with FIG. 5. The carrier and subcarrier signals transmitted by the transponder are received by the three antennas 11, 12, and 13.

As described previously, the three antennas are located in a mutually perpendicular relationship to each other according to the interferometer principle. The purpose of the three receivers 20, 21, and 22, which are fed by antennas 11, 12, and 13 respectively, is to measure the phase difference in the received carrier signal at the antennas. The receiver 22 is actually a phase-locked loop circuit arranged to lock on the phase of the carrier signal by means of the injected reference technique described in the referenced copending application. The received carrier signal arriving at antenna 13 is added to an injected reference signal in an adder 32a. The injected reference signal is offset from the received carrier signal by 38 kc. and is designed to track the received carrier signal. The defined injected reference signal is generated in a VCO 33 at approximately 5 mc. and suitably multiplied to the desired X-band frequency in a varactor multiplier 33a. The injected reference signal is modulated in a modulator 34 by the same 4 mc. oscillator 31 used to modulate the transmitted carrier signal. The purpose of this additional modulation of the injected reference signal is to generate an injected reference signal for the subcarrier that is used in connection with the ranging circuit and has no effect on the angle bearing determinations presently being described. The output of the adder 32a will therefore consist of at least the received X-band carrier signal and subcarrier signal and the injected reference signals which are 38 kc. removed from the carrier signal and subcarrier signal, respectively. Since present day transistorized circuits cannot satisfactorily operate at X-band frequencies, a suitable low frequency oscillator and multiplying circuits are used to generate a local oscillator signal which is mixed with the received signals from the adder 32a in a mixer 35 to thereby produce representative signals at frequencies that are more easily amplified and controlled by present-day, solid-state devices. For example, in the preferred embodiment the local oscillator frequencies are chosen so as to reduce the received X-band carrier signal to 65.5 mc. The output of the mixer 35 is fed to a carrier amplifier 36 arranged to pass a 65.5 mc. signal with a bandwidth of one mc. The result is that the reduced carrier signal and injected reference signal which is offset from the carrier by 38 kc. are amplified and passed while the subcarrier signal which is displaced from the carrier by 4 mc. and reduced in frequency to 69.5 mc. is blocked. The output of the carrier amplifier 36 consisting of the amplified carrier frequency of 65.5 mc. with the injected reference signal offset by 38 kc. is fed to an envelope detector 37 which detects the offset frequency of 38 kc. The detected 38 kc. signal from the envelope detector 37 is fed to a phase detector 38 where the phase of the detector signal is compared with the phase of a 38 kc. signal generated by an oscillator 39. A phase difference between the phase of the reference signal and the detected signal will result in an output error signal which is fed to a filter and amplifier 40 which produces a D.C. signal having an amplitude and sign depending on the amount of change and direction of change between the two signals. This D.C. signal from the filter and amplifier 40 controls the frequency of the VCO 33. It will be appreciated that the described carrier loop will continuously generate an injected reference signal which is offset from the received carrier signal by 38 kc. and that in effect the phase information contained in the received carrier signal is effectively transferred to the 38 kc. signal which is more easily controlled than the X-band frequency of the received carrier signal.

The phase-locked carrier loop in receiver 22 is used as a standard for determining the phase difference in the signal received by antennas 11 and 12. Both receivers 20 and 21 are identical in operation in that a comparison is made between the received signal and the phase of the carrier phase-locked signal described in connection with receiver 22. For example, in receiver 20, the carrier signal is received by antenna 11, which is fed to an adder 41 which adds the received carrier signal with the same injected reference signal generated in the carrier phase-locked loop of receiver 22. The output of adder 41 is fed to a mixer 42 which uses the same local oscillator signal as described in connection with mixer 35 of receiver 22. The frequency reduced carrier signal of 65.5 mc. and the injected reference signal is amplified in a carrier amplifier 43 which is identical to carrier amplifier 36. The 38 kc. offset signal is detected by an envelope detector 44, the output of which is fed to a phase detector 45 which continuously compares the phase of the detected 38 kc. signal against the same 38 kc. reference oscillator 39 used in connection with receiver 22. The output signal from the phase detector 45 will therefore represent the phase difference between the signal received by antenna 11 as compared with the same carrier signal received by antenna 13 of receiver 22 and depending on the physical location of the antenna may be identified as a pitch bearing angle signal.

Receiver 21 is identical with receiver 20 just described. The carrier signal received by antenna 12 is fed to an adder 46 which adds the carrier signal to the same injected reference signal generated in receiver 22 and used in receiver 20. The output of adder 46 is mixed with the same local oscillator generated signal in a mixer 47, the output of which is amplified in a carrier amplifier 48 having the same characteristics as carrier amplifier 43 and 36 located in receivers 20 and 22, respectively. The 38 kc. offset signal is detected in an envelope detector 49 and compared with a 38 kc. reference signal generated by oscillator 39 in a phase detector 50. The output of the phase detector will therefore comprise the information representing the phase difference between the carrier signal received by antenna 12 as compared with the carrier signal received by antenna 13; and depending again on the physical location of the antenna 12, the output signal may be identified as the yaw bearing angle signal.

The yaw and pitch bearing angles just described are obtained directly from the X-band carrier signal received from the transponder. At X-band (10,000 megacycles) a wavelength is equal to approximately 1/10 foot or 1.2". With present-day phase measuring techniques it is possible to reliably measure phase to within 1 degree or 1/360 of 1.2", which is approximately .00334" in electrical degrees. The spacing of the receiving antennas will determine the final accuracy that is possible. The use of large base lines between receiving antennas will, of course, result in larger accuracies.

The ranging information is obtained substantially from the 4 mc. subcarrier which is transmitted to the transponder and coherently retransmitted back to the radar station. As mentioned previously, the 4 mc. oscillator 31, which modulates the transmitted carrier signal, also modulates the injected reference signal in modulator 34. The result of this modulation is to produce an injected reference signal for the received subcarrier signal. As mentioned previously, the subcarrier signal and its injected reference signal is also fed to receivers 20 and 21; but due to the one mc. bandwidth limitation of carrier amplifiers 36, 43, and 48 in receivers 22, 20, and 21, respectively, the subcarrier signal and its injected reference signal are blocked.

The output of mixer 35 is also fed to the ranging circuit comprising a subcarrier amplifier 51 having a bandwidth of one mc. and capable of passing a frequency of 69.5 mc. The effect is that subcarrier amplifier 51 will effectively pass the subcarrier frequency and its injected reference signal while at the same time reject the carrier signal. The output of the subcarrier amplifier 51 is fed to an envelope detector 52, which detects the 38 kc. difference frequency. The detected 38 kc. signal is fed to a phase detector 53, which effectively compares the detected 38 kc. signal against the same 38 kc. reference signal generated by the reference oscillator 39. The output of the phase detector 53 is a signal representing the difference in phase between the 4 mc. signal generated by the 4 mc. oscillator and the received 4 mc. subcarrier signal received by antenna 13. The phase information on the received 4 mc. subcarrier signal is preserved since the defined phase information is effectively contained in the phase of the 38 kc. signal, which is substantially unaffected by active elements in the receiver. Since the wavelength of the 4 mc. signal can be shown to be equal to 123 feet, the output of the phase detector 53 will accurately indicate the phase change in the 4 mc. signal between that transmitted and that received, which information is representative of the range between the first and second objects from zero to 123 feet. It is recognized that at ranges involving multiples of 123 feet that an ambiguity may result. Copending application, Serial No. 248,680, filed December 31, 1962, discloses and claims additional equipment for resolving ambiguity at extended ranges involving multiples of 123 feet.

Figure 4:
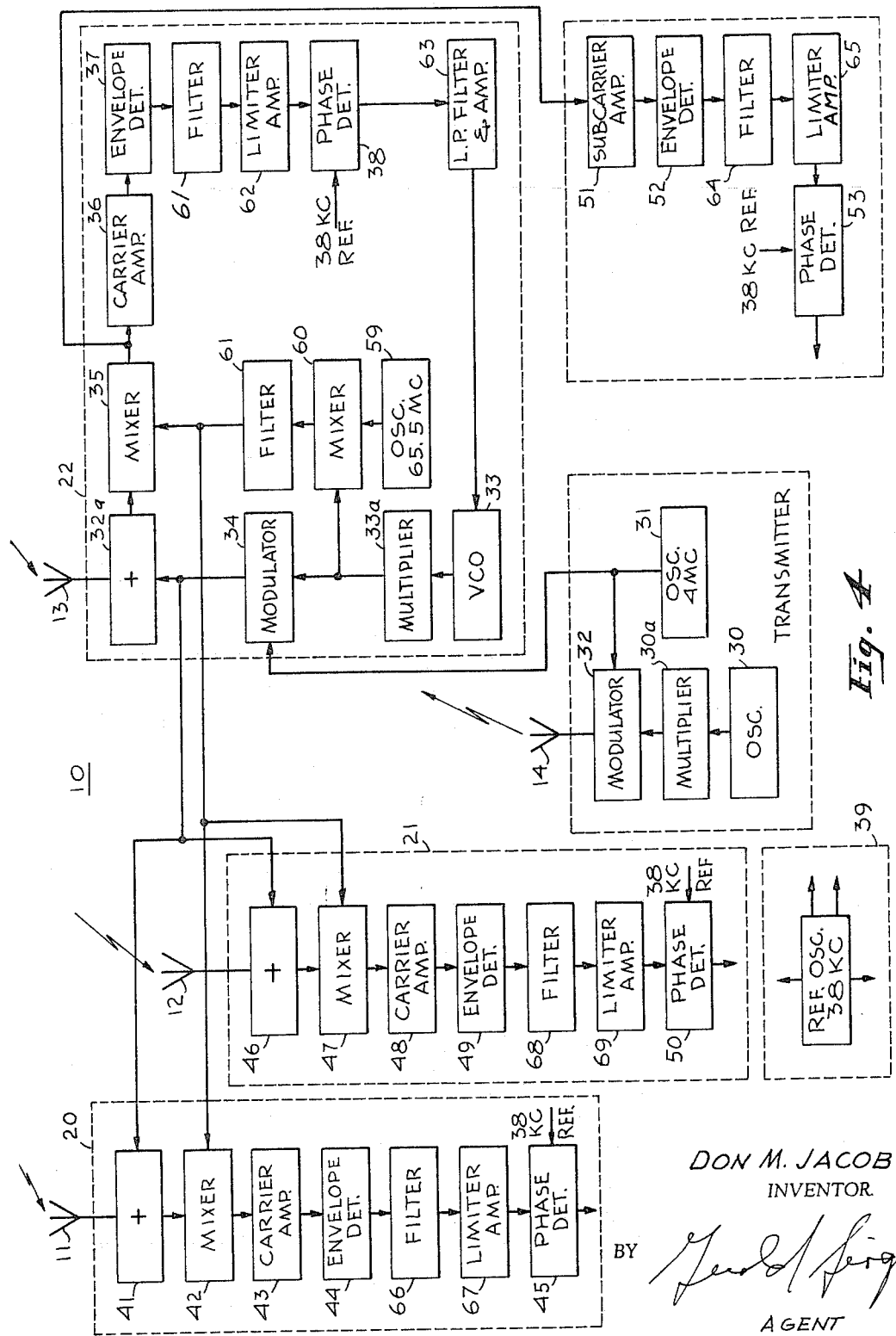
FIG. 4 is a more complete block diagram of the radar station illustrated in FIG. 3.

Referring now to FIG. 4, there is shown a more complete diagram of the radar which is located in the first object 10 and schematically described in connection with FIG. 3. In describing the more complete embodiment of FIG. 4, similar numbers previously applied will be used only where the indicated elements are identical. In those cases where many functions were combined for purposes of explanation, different numbers will be assigned to the separate functions as described in FIG. 4. The transmitter portion of the radar consists essentially of a 5 mc. oscillator 30, which is harmonically multiplied to X-band by a multiplier 30a. The multiplication performed in the multiplier 30a is of the order of 2304. The 4 mc. oscillator 31 modulates the X-band carrier in the modulator 32 before being transmitted from antenna 14 to the transponder as an X-band carrier and a subcarrier having a 4 mc. separation. Since the defined radar system is basically a continuous wave Doppler radar system, it is necessary to provide a frequency separation between the carrier and subcarrier signal being transmitted from antenna 14 to the transponder and the carrier and subcarrier signal which is coherently transmitted back to antennas 11, 12, and 13, associated with the radar system. In the preferred embodiment, the transponder coherently retransmits a carrier and a 4 mc. subcarrier having the same phase relationship as received by the transponder with the exception that the frequency of the carrier signal transmitted by the transponder is offset a given amount, for example, 646 mc. The injected reference signal generated in receiver 22 is originally generated as a 5 mc. signal in VCO 33, the output of which is fed to a multiplier 33a, having a multiplication factor in the preferred embodiment of 2160. The output of multiplier 33a is actually the injected reference signal which differs from the received carrier signal by 38 kc. The injected reference signal for the received carrier signal is modulated by the 4 mc. oscillator 31 in the modulator 34, thereby producing an injected reference signal for the subcarrier which is 4 mc. removed from the injected reference signal of the carrier. The adder 32a combines the injected reefrence signals and the carrier and subcarrier signals and feeds these signals into a mixer 35. Since these signals are all at X-band, it is necessary to perform a mixing operation with a local oscillator that is substantially at X-band to reduce the frequency of these signals to a frequency that is more easily amplified and handled by present-day transistor circuits. The local oscillator signal is obtained from an oscillator 59, which is operating at a convenient frequency of 65.5 mc. The output of the oscillator 59 is mixed with the output of the multiplier 33a in a mixer 60. Since the output of the multiplier 33a is the injected reference signal which is locked to the received carrier signal but offset by 38 kc., there is produced an injected reference signal at X-band frequency ±65.5 mc. Since only the low frequency side of the mixed signals is used, the output of the mixer 60 is fed to a suitable single sideband filter 61 which filters out the high side and feeds the resultant signal to the mixer 35. The X-band signal fed to the mixer 35 is the defined local oscillator signal consisting of a carrier phase-locked signal at X-band plus 38 kc. minus 65.5 mc. The purpose of the mixer 35 is actually to subtract this local oscillator signal from all of the signals fed from the adder 32a. The frequencies are chosen so that the carrier amplifier 36 will pass a 65.5 mc. signal which represents the carrier signal and its injected reference signal while rejecting the subcarrier signal, which is 4 mc. displaced from the carrier signal. This rejection is effectively produced by limiting the bandwidth to substantially one mc. The opposite, of course, is true with respect to the subcarrier amplifier 51, which is designed to pass the subcarrier signal which is the carrier signal plus 4 mc. or 69.5 mc. and its injected reference signal while at the same time rejecting the carrier signal. This is achieved in a similar manner by limiting the bandwidth of the subcarrier amplifier to one MC. The output of the carrier amplifier 36 is fed to the envelope detector 37, which detects the difference signal of 38 kc. and feeds this detected signal to a filter 61, which removes the high frequency components. The filtered 38 kc. signal from filter 61 is fed to a limiter amplifier 62 which produces a substantially square wave of constant amplitude at the repetition rate of 38 kc. The output of the limiter amplifier 62 is fed to the phase detector 38 which compares the detected 38 kc. signal with the 38 kc. reference signal generated by the reference oscillator 39. The output of the phase detector is fed to a low pass filter and amplifier 63, which produces a D.C. signal having sense and amplitude dependent on the phase relationship between the detected 38 kc. signal and the reference oscillator 38 kc. signal. The output of the low pass filter and amplifier 63 controls the 5 mc. signal generated in the VCO 33.

The ranging information is obtained from the output of the mixer 35 and fed to the subcarrier amplifier 51, which amplifies the subcarrier signal and its injected reference signal. The envelope detector 52 detects the difference frequency of 38 kc. and feeds this signal to a filter 64, which removes the high frequency components. The output of the filter 64 is fed to a limiter amplifier 65, which generates a substantially square wave at a 38 kc. rate similar to limiter amplifier 62. The output of the limiter amplifier 65 is fed to the phase detector 53 where the signal is phase compared with the 38 kc. reference signal generated by reference oscillator 39. Since the 4 mc. subcarrier is phase locked to the carrier signal, the output of the phase detector 53 will indicate the phase difference between the transmitted 4 mc. subcarrier and the received 4 mc. subcarrier at the antenna 13. This information will therefore contain range information within the limits of a single cycle of the 4 mc. subcarrier signal and indicate range from 0 to 123 feet. The operation and construction of receivers 20 and 21 are substantially as described, except that the output of the envelope detector 44 in receiver 20 feeds a filter 66, which is similar to filters 64 and 61. The output of the filter 66 is fed to a limiter amplifier 67 which feeds the phase detector 45. Similarly, in receiver 21 the output of the envelope detector 49 feeds a similar filter 68 and a limiter amplifier 69, which in turn feeds the phase detector 50.

Figure 5:
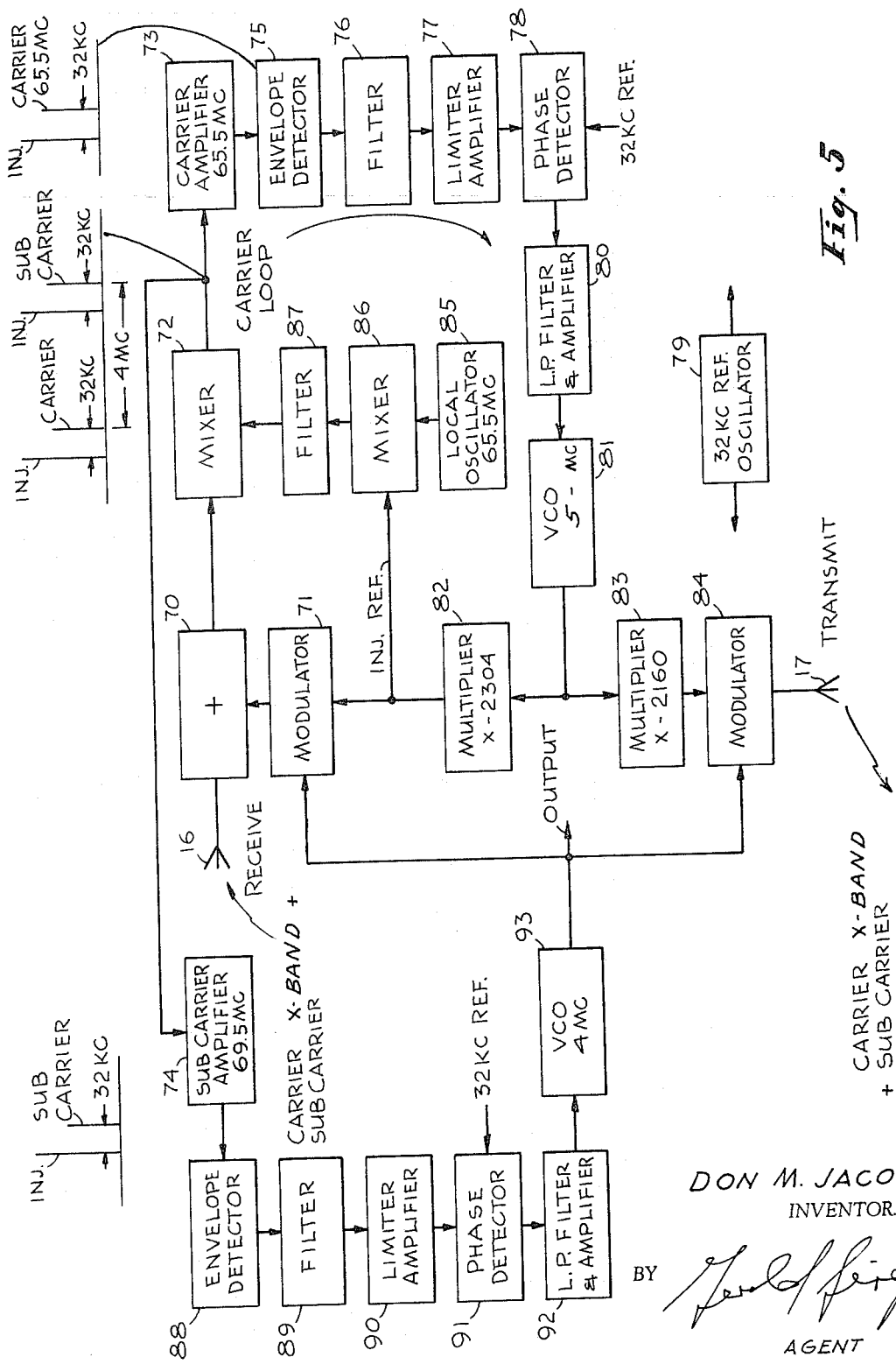
FIG. 5 is a block diagram of the transponder.

Referring now to FIG. 5, there is shown a block diagram illustrating the receiver and transmitter comprising the transponder. As mentioned previously, the intended purpose of the transponder is to receive the carrier and subcarrier signal from the radar and coherently transmit a carrier and subcarrier having the same phase relationship as received. Both the carrier signal and the subscriber as received by antenna 16 and are fed to an adder circuit 70. In the transponder, the injected reference signal is selected to be 32 kc. lower than the received signals. The injected reference signal is fed to the adder 70 from a modulator 71. The output of the adder 70 feeds a mixer 72 which receives the X-band carrier signal and its injected reference signal which is 32 kc. below the carrier frequency and the subcarrier signal which is 4 mc. higher than the carrier signal with its injected reference signal which is 32 kc. below the received subcarrier signal. As mentioned in connection with the radar system, the local oscillator frequency is chosen to produce, at zero Doppler, a 65.5 mc. carrier and a 69.5 mc. subcarrier. The output mixer 72 feeds a carrier amplifier 73, which is designed to pass 65.5 mc. and have a bandwidth of one mc. thereby effectively blocking the passage of the subcarrier signal. The output of the mixer 72 also feeds a subcarrier amplifier 74, designed to pass 69.5 mc. and have a bandwidth of one mc., thereby effectively preventing the carrier signal from being passed.

The carrier amplifier 73 feeds an envelope detector 75, which detects the difference frequency of 32 kc. The 32 kc. signal is filtered in a filter 76 and fed to a limiter amplifier 77 for squaring off the 32 kc. signal at a constant amplitude. The output of limiter 77, which is a square wave, having a frequency of 32 kc., is fed to a phase detector 78 which compares the phase of the detected 32 kc. signal against a 32 kc. reference signal generated by a 32 kc. reference oscillator 79. Any phase difference between the reference 32 kc. signal and the detected 32 kc. signal will result in the output of the phase detector 78, which is fed to a low pass filter and amplifier 80. The low pass filter and amplifier 80 will produce a D.C. signal having sense and amplitude dependent on the phase difference between the detected signal and the reference signal as detected in the phase detector 78. The D.C. output from the low pass filter and amplifier 80 controls a VCO 81 having a frequency of approximately 5 mc. The 5 mc. output of the VCO 81 is multiplied approximately 2304 times in a multiplier 82, which is approximately the X-band carrier frequency less 32 kc. and represents the injected reference signal for the received carrier signal. The output of the multiplier 82 feeds the modulator 71, which receives a 4 mc. modulation for generating the injected reference signal of the received subcarrier signal. The 5 mc. signal from the VCO 81 is also used as the basis for the transmitted carrier signal from the transponder after it is multiplied approximately 2160 times in a multiplier 83. The difference in multiplying factors of 2304 in multiplier 82 and 2160 in multiplier 83 will account for the approximate 646 mc. difference between the received carrier signal from the radar and the transmitted carrier signal from the transponder. The output of the multiplier 83 is an X-band carrier signal that is transmitted from the antenna 17 after it is passed through a modulator 84. The technique for generating an X-band local oscillator signal for reducing the carrier frequency and subcarrier signal to 65.5 mc. and 69.5 mc., respectively, is achieved in a similar manner as described for the radar. A 65.5 mc. signal is generated in a conventional solid-state, local oscillator 85. The proper X-band frequency is achieved by mixing the 65.5 mc. signal from the local oscillator 85 with the X-band injected reference signal from the multiplier 82 in a mixer 86. It will be remembered that the output of the multiplier 82 is the injected reference signal, which is offset on the lower side from the carrier signal by 32 kc. The output from the mixer 86 is filtered in a filter 87 to remove the higher frequencies. The output of filter 87 is mixed with the carrier and subcarrier and injected reference signals in the mixer 72, as previously described.

The output of the mixer 72 also includes the 69.5 mc. subcarrier with its injected reference signal. The subcarrier amplifier 74 will pass only the 69.5 mc. subcarrier signal and its injected reference signal and discriminate against the 65.5 mc. carrier signal and its injected reference signal due to the one mc. bandpass of the amplifier. The output of the subcarrier amplifier 74 is fed to an envelope detector 88, which detects the difference or 32 kc. signal and feeds this signal to a filter 89. The filter 89 removes all high frequency components and feeds the signal to a limiter amplifier 90 which squares up the signal and produces a substantially square 32 kc. signal, which is fed to a phase detector 91. The phase detector 91 compares the detected 32 kc. signal with a 32 kc. reference signal also generated by the 32 kc. reference oscillator 79. The phase detector 91 will generate a signal based only on a phase difference between the detected 32 kc. signal and the reference 32 kc. signal and feed this error signal to a low pass filter and amplifier 92. The output of the low pass filter and amplifier 92 will be a D.C. signal varying in amplitude and sign as a function of the phase difference between the detected and the reference 32 kc. signals. The D.C. output of the low pass filter and amplifier 92 controls the frequency of a 4 mc. VCO 93. The 4 mc. signal from the VCO 93 is fed both to the modulator 71 which thereby places a component of the 4 mc. signal on the injected reference fed to the adder 70 and also modulates the transmitted signal to produce a subcarrier signal 4 mc. removed from the carrier signal.

A review of the described circuits will show that the carrier loop has phase locked the received carrier signal with the transmitted carrier signal and that the defined subcarrier loop which is phase locked to the received subcarrier signal by means of the offset injected reference of 32 kc. also modulates the transponder with the same phase-locked 4 mc. signal. Since both the injected reference and the output transmitter are modulated with the same 4 mc. phase-locked signal from the VCO 93, it can now be seen that the transmitted subcarrier signal will be phase locked to the subcarrier signal. The transmitted frequency from the transponder is related to the received frequency by the following expression:

$$f_t = \frac{15}{16}(f_r - 0.032)$$

where $f_t$ and $f_r$ are the transmitted frequency and the re-received frequency of the transponder in megacycles. For zero Doppler, $f_t$ is at 9699.969888 mc.; and the carrier frequency of the VCO 81 is at 4.4907268 mc. Phase coherency between the received carrier signal and the transmitted carrier signal is achieved by using VCO 81 as the carrier and the injected reference source.

Figure 6:
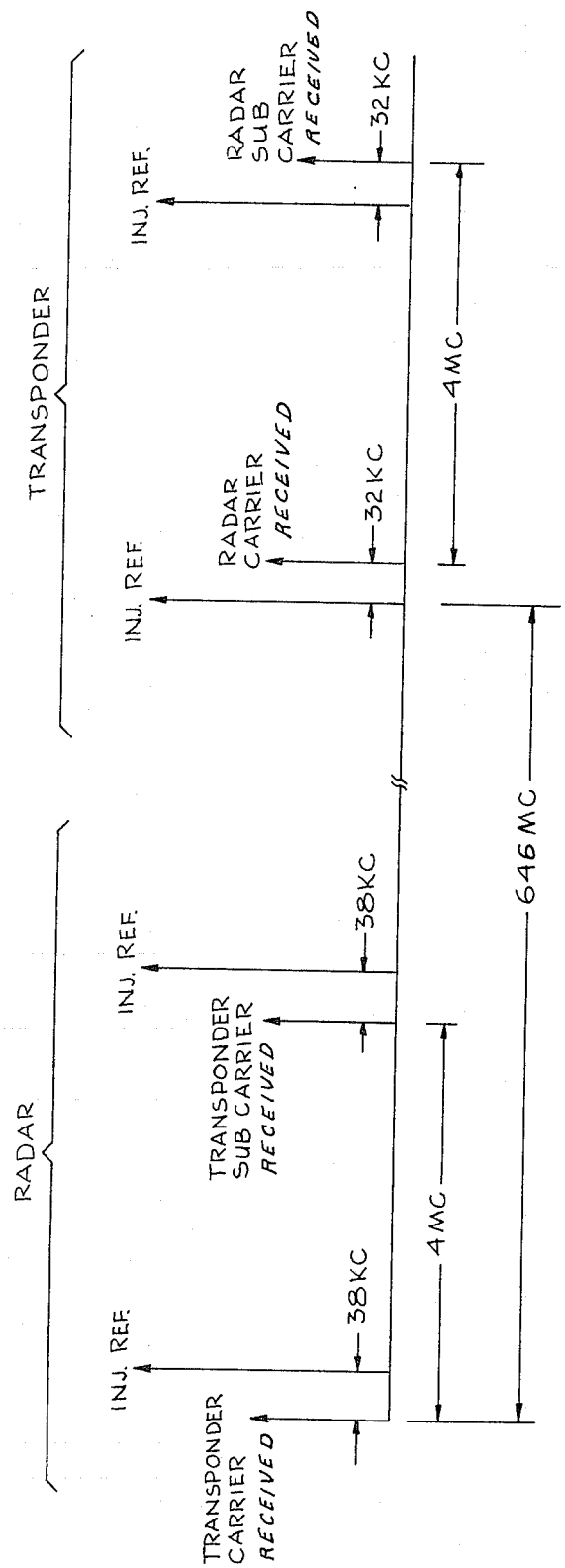
FIG. 6 illustrates the frequency spectrum of the transmitted, received and injected signals associated with the radar and transponder.

Referring now to FIG. 6, there is shown a frequency spectrum more fully illustrating the relationship of the carrier and subcarrier signals transmitted both by the radar and the transponder. In the preferred embodiment, the exact frequency of the radar carrier was chosen to be 10,346.66575 mc., which was modulated by the 4 mc. VCO to produce the radar subcarrier signal. The exact frequency is a function of the frequency of the oscillator 30 in the transmitter of the radar. In the preferred embodiment the frequency of the oscillator 30 was selected to be 4.4907407 mc., which was multiplied by a factor of 2304 in multiplier 30a, thereby resulting in a radar carrier having a frequency of 10,346.66575 mc. plus a 4 mc. subcarrier. The injected reference signal in the transponder 15 was generated so as to track the received radar carrier and the radar subcarrier signals on the low side with a separation of 32 kc., as illustrated. The carrier frequency transmitted by the transponder is a function of the frequency of the VCO 81 and the multiplier 83, illustrated in FIG. 5. In the preferred embodiment the frequency of the VCO 81 was chosen to be 4.4907268 mc., which was multiplied by a factor of 2160 in multiplier 83, thereby resulting in a carrier frequency of 9,699.969888 mc. and a 4 mc. subcarrier, as illustrated. As mentioned previously, the frequency offset between the carrier frequency transmitted by the transponder and the carrier frequency transmitted by the radar transmitter is needed to prevent spurious harmonic feedthrough to the individual receivers. The frequency difference of approximately 646 mc. between the transmitted carrier frequency of the transponder and the carrier transmitted frequency of the radar is achieved by means of the difference in the multiplying factor of the multiplier 83 in the transponder, which multiplies the frequency of VCO 81 by a factor of 2160, thereby generating the carrier frequency from the transponder of 9,699.969888 mc. The carrier frequency from the radar, illustrated in FIG. 4, is achieved by multiplying the oscillator frequency generated by oscillator 30 by a factor of 2304 in multiplier 30a, thereby generating a radar carrier frequency of approximately 10,346.66575 mc. Since the carrier frequency in the transponder is basically generated by the VCO 81, which generates the offset injected reference signal, it can be appreciated that the difference frequency of 646 mc. will represent the difference between the transmitted carrier signal from the transponder and the injected reference signal generated in the transponder. In the radar the injected reference is generated 38 kc. on the high side of the received carrier and subcarrier signals. The reasons for the different offset frequencies of the 32 kc. in the transponder and 38 kc. in the radar will become more apparent in the copending application, Serial No. 248,680, filed December 31, 1962. In addition, it will be demonstrated how an X-band Doppler signal may be derived together with a suitable bias frequency that can be used to determine if the range between the two objects in space is closing or opening. The exact frequencies described represent a preference since it is obvious that different frequencies may be selected depending on the accuracies needed.

In the preferred embodiment described, a completely solid-state transmitter and receiver have been described and illustrated. The multiplication factors mentioned have been achieved primarily by means of present day varactor generators; and as a result, the exact carrier frequencies are a function of the multiples available.

The requirements on frequency stability, spectral purity, and space environment dictate the use of a good oven-controlled crystal oscillator. Receiver shielding requirements are minimized if its frequency is chosen to be above the intermediate frequency, thus removing the possibility of IF interference due to oscillator harmonics. However, investigation of the stability characteristics of various crystal oscillators disclosed that the requisite stability over a period of one month could be assured only for oscillators whose frequency is below 5 mc. Other factors influencing the choice of frequency are the required X-band transmit-receive offset and the restriction that in the interest of power efficiency frequency multiplication factors of two, three, and at most a single five be used in the varactor multiplier chains. In addition, it is considered desirable to obtain the necessary multiplier chain power amplification at a frequency in the 100–120 mc. range. It is desired that the X-band transmit-receive offset be large to ease microwave filter design requirements yet small enough to avoid modulation phase shifts on transmitted and received signals in the common broadband microwave elements. As a compromise between these factors, an X-band separation of approximately 650 mc. has been chosen with post-amplification varactor multiplication factors of 90 for the injected reference and 96 for the transmitter. The further specification of 9700.000 mc. as the low frequency for the coherent link establishes the basic crystal frequency at 4.4907407 mc. The corresponding transmitter carrier frequency is 10,346.667 mc. The transmitter multiplier chain then consists of a buffer amplifier following the crystal oscillator, an X24 multiplication with varactor stages, power amplification at 107.77778 mc., and an X96 varactor chain. The choice of 9700 mc. for the low frequency in the coherent link is based on the desirability of avoiding the concentration of X-band radars in the X-band region immediately below that frequency. Investigation of a number of available crystal oscillators disclosed that the James Knight Type JKTO–43TO oscillator appears to meet all of the above requirements. This oscillator has a maximum frequency drift of 1.5 parts in $10^7$ over one month.

This completes the description of the embodiment of the invention illustrated herein. However, many modifications and advantages thereof will be apparent to persons skilled in the art without departing from the spirit and scope of this invention. Accordingly, it is desired that this invention not be limited to the particular details of the embodiment disclosed herein, except as defined by the appended claims.

The embodiments of the invention in which an exclusive property or privilege is claimed are defined as follows:

1. In combination,
    a first station and a second station movable with respect to each other,
    means located in said first station comprising a continuous wave radar transmitter for generating and transmitting a first carrier signal to said second station,
    said second station comprising means for receiving said first carrier signal,
    means for adding said first carrier signal with an injected reference signal before all phase varying stages, said injected reference signal differing from said carrier signal by an offset frequency,
    means for amplifying said first carrier signal and said injected reference signal,
    means for detecting said offset frequency from the composite signal comprising said carrier signal and said injected reference signal,
    phase comparing means responsive to said offset frequency and a reference signal from an oscillator having a frequency equal to said audio offset frequency for generating a substantially D.C. signal,
    voltage controlled oscillator means being controlled by said D.C. signal for generating said injected reference signal at a frequency differing from said first carrier signal by said offset frequency and containing the same phase information as said first carrier signal,
    means controlled by said voltage controlled oscillator for transmitting a second carrier signal having the same phase as said received first carrier signal, and
    a plurality of antennas located on said first station in an interferometer configuration, said antennas connected in circuit for measuring the relative phase shift of said received second carrier signal at said antennas thereby providing information indicative of the bearing angle between said first and said second station.

2. In combination,
    a first station and a second station movable with respect to each other,
    means located in said first station comprising a continuous wave radar transmitter for generating and transmitting a first carrier signal to said second station,
    said second station comprising means for receiving said first carrier signal,
    means for adding said first carrier signal with an injected reference signal before all phase varying stages, said injected reference signal differing from said frequency varying input signal by an offset frequency,
    means for amplifying said frequency varying input signal and said injected reference signal,
    envelope detecting means for detecting said audio offset frequency from the composite signal comprising said frequency varying input signal and said injected reference signal,
    low pass filtering means for removing said input and injected reference signals from said offset frequency,
    gain control means for generating a substantially constant amplitude signal at said offset frequency,
    a reference oscillator generating a substantially fixed frequency reference signal equal to said offset frequency,
    phase comparing means responsive to said amplitude limited audio offset frequency and said reference signal for generating a D.C. signal having amplitude and sense depending on the phase difference between said signals,
    voltage controlled oscillator means being controlled by said D.C. signal for generating said injected reference signal at a frequency differing from said frequency varying input signal by said offset frequency and containing the same phase information as said first carrier signal,
    means controlled by said voltage controlled oscillator for transmitting a second carrier signal having the same phase as said received first carrier signal, and
    at least three antennas located on said first station in an interferometer configuration, each of said antennas connected in circuit for measuring the relative phase shift of said received second carrier signal at said three antennas thereby providing information indicative of the bearing angle between said first and said second station.

3. In combination,
    a first station and a second station movable with respect to each other,
    means located in said first station comprising a continuous wave radar transmitter for generating and transmitting a first carrier signal and a first subcarrier signal to said second station,
    means located in said second station for receiving said first carrier signal and said first subcarrier signal and generating a second carrier signal and a second subcarrier signal, said means further including means for adjusting the phase of said second carrier signal in response to the phase of said first carrier signal and means for adjusting the phase of said second subcarrier signal in response to the phase of said first subcarrier signal whereby said second carrier signal and said second subcarrier signal have the same phase relationship as said received first carrier signal and said first subcarrier signal,
    the frequency difference between said second carrier signal and said second subcarrier signal to be substantially equal to the frequency difference between said first carrier signal and said first subcarrier signal, and
    means in said first station for measuring the phase of the received second subcarrier signal and comparing said measured phase with the phase of the transmitted first subcarrier signal thereby providing information indicative of the range between said first station and said second station.

4. In combination,
    a first station and a second station movable with respect to each other,
    means located in said first station comprising a continuous wave radar transmitter for generating and transmitting a first carrier signal and a first subcarrier signal to said second station,
    means located in said second station for receiving said first carrier signal and said first subcarrier signal and generating a second carrier signal and a second subcarrier signal, said means further including means for adjusting the phase of said second carrier signal in response to the phase of said first carrier signal and means for adjusting the phase of said second subcarrier signal in response to the phase of said first subcarrier signal whereby said second carrier signal and said second subcarrier signal have the same phase relationship as said received first carrier signal and said first subcarrier signal, the frequency difference between said second carrier signal and said second subcarrier signal to be substantially equal to the frequency difference between said first carrier signal and said first subcarrier signal, a plurality of antennas located on said first station in an interferometer configuration, each of said antennas connected in circuit for measuring the relative phase shift of said received second carrier signal at said antennas thereby providing information indicative of the bearing angle between said first station and said second station, and means in said first station for measuring the phase of the received second subcarrier signal and comparing said phase with the phase of the transmitted first subcarrier signal thereby providing information indicative of the range between said first station and said second station.

5. In combination, a first station and a second station movable with respect to each other, means located in said first station comprising a continuous wave radar transmitter for generating and transmitting a first carrier signal and a first subcarrier signal to said second station, said second station comprising a first phase tracking loop comprising means for combining said received first carrier signal with a first injected reference signal ahead of all phase varying stages, said first injected reference signal differing from said received first carrier signal by an offset frequency, first voltage controlled oscillator means responsive in part to the phase of said received first carrier signal for generating both said first injected reference signal and a second carrier signal for transmission to said first station, a second phase tracking loop comprising means for combining said received first subcarrier signal with a second injected reference signal before amplification or detection, said second injected reference signal differing from said received first subcarrier signal by said offset frequency, a second voltage controlled oscillator means controlled in part by the phase of said received first subcarrier signal for modulating both said first injected reference signal to produce said second injected reference signal and said second carrier signal to produce a second subcarrier signal, the phase relationship between said received first carrier signal and said first subcarrier signal being substantially the same as the phase relationship between said transmitted second carrier signal and said second subcarrier signal, and means in said first station for measuring the phase of the received second carrier signal and comparing said phase with the phase of the transmitted first subcarrier signal thereby providing information indicative of the range between said first station and said second station.

6. A combination according to claim 5 which includes a plurality of antennas located on said first station in an interferometer configuration, each of said antennas connected in circuit for measuring the relative phase shift of said received second carrier signal at said antennas thereby providing information indicative of the bearing angle between said first station and said second station.

7. In combination, a first station and a second station movable with respect to each other, means located in said first station comprising a continuous wave radar transmitter for generating and transmitting a first carrier signal and a first subcarrier signal to said second station, said second station comprising a first phase tracking loop comprising means for combining said first carrier signal with a first injected reference signal before amplification or detection, said first injected reference signal differing from said received first carrier signal by an offset frequency, first means for amplifying said received first carrier signal and said first injected reference signal, first means for detecting said offset frequency from the composite signal comprising said received first carrier signal and said first injected reference signal, first phase comparing means responsive to said offset frequency and a reference signal from an oscillator having a frequency equal to said offset frequency for generating a first D.C. signal, first voltage controlled oscillator means being controlled by said first D.C. signal for generating both said first injected reference signal at a frequency differing from said received first carrier signal by said offset frequency and a second carrier signal, a second phase tracking loop comprising means for combining said first subcarrier signal with a second injected reference signal before amplification or detection, said second injected reference signal differing from said first subcarrier signal by said offset frequency, second means for amplifying said first subcarrier signal and said second injected reference signal, second means for detecting said offset frequency from the composite signal comprising said first subcarrier signal and said second injected reference signal, second phase comparing means responsive to said offset frequency and said reference signal for generating a second D.C. signal, a second voltage controlled oscillator means controlled by said second D.C. signal for modulating both said first injected reference signal to produce said second injected reference signal and said second carrier signal to produce a second subcarrier signal whereby the phase relationship between said received first carrier signal and said first subcarrier signal is substantially the same as the phase relationship between said transmitted second carrier signal and said second subcarrier signal, and means in said first station for measuring the phase of the received second carrier signal and comparing said phase with the phase of the transmitted first subcarrier signal thereby providing information indicative of the range between said first station and said second station.

8. A combination according to claim 7 which includes at least three antennas located on said first station in an interferometer configuration, each of said antennas connected in circuit for measuring the relative phase shift of said received second carrier signal at said three antennas thereby providing information indicative of the bearing angle between said first station and said second station.

9. In combination, a first station and a second station movable with respect to each other, means located in said first station comprising a continuous wave radar transmitter for generating and transmitting a first carrier signal and a first subcarrier signal to said second station, means located in said second station for receiving said first carrier signal and said first subcarrier signal and transmitting a second carrier signal and a second subcarrier signal having the same phase relationship as said received first carrier signal and said first subcarrier signal, the frequency difference between said first carrier signal and said first subcarrier signal being substantially the same as the frequency difference between said second carrier signal and said second subcarrier signal, at least three antennas located on said first station in an interferometer configuration, one of said antennas connected to a phase tracking loop circuit for combining said received second carrier signal with an injected reference signal ahead of all phase varying stages, said injected reference signal containing the same phase information as said received second carrier and differing from said received second carrier signal by an offset frequency, a voltage controlled oscillator means responsive in part to the phase of said received second carrier signal for generating said injected reference signal, each of said other antennas connected in circuit for measuring the relative phase shift between said received second carrier signal at said antennas and said injected reference signal thereby providing information indicative of the bearing angle between said first station and said second station, and means in said first station for measuring the phase of the received second carrier signal and comparing said phase with the phase of the transmitted first subcarrier signal thereby providing information indicative of the range between said first station and said second station.

10. In combination, a first station and a second station movable with respect to each other, means located in said first station comprising a continuous wave radar transmitter for generating and transmitting a first carrier signal and a first subcarrier signal to said second station, means located in said second station for receiving said first carrier signal and said first subcarrier signal and transmitting a second carrier signal and a second subcarrier signal having the same phase relationship as said received first carrier signal and said first subcarrier signal, the frequency difference between said first carrier signal and said first subcarrier signal being substantially the same as the frequency difference between said second carrier signal and said second subcarrier signal, at least three antennas located on said first station in an interferometer configuration, one of said antennas connected to a phase tracking loop circuit for combining said received second carrier signal with an injected reference signal ahead of all phase varying stages, said injected reference signal containing the same information as said received second carrier signal and differing from said received second carrier signal by an offset frequency, a voltage controlled oscillator means responsive in part to the phase of said received second carrier signal for generating said injected reference signal, each of said other antennas connected in circuit for measuring the relative phase shift between said received second carrier signal at said antennas and said injected reference signal thereby providing information indicative of the bearing angle between said first station and said second station, means for modulating said injected reference signal with the same means generating said first subcarrier for generating a second injected reference signal having phase information of said transmitted first subcarrier signal, and means for measuring the phase difference between said second injected reference signal and said received second subcarrier signal as a measure of the range between said first station and said second station.

11. A combination according to claim 10 in which said injected reference signals in said second station are lower in frequency than said received signals.

12. A combination according to claim 10 in which said injected reference signals in said first station are higher in frequency than said received signals.

13. A coherent transponder comprising means for receiving a first and second signal having a given frequency relationship to each other, a first phase tracking loop comprising means for combining said received first signal with a first injected reference signal ahead of all phase varying stages, said first injected reference signal differing from said received first signal by an offset frequency, first voltage controlled oscillator means responsive in part to the phase of said received first signal for generating both said first injected reference signal and a first transmission signal, a second phase tracking loop comprising means for combining said received second signal with a second injected reference signal before amplification or detection, said second injected reference signal differing from said received first signal by said offset frequency, and a second voltage controlled oscillator means controlled in part by the phase of said received second signal for modulating both said first injected reference signal to produce said second injected reference signal and said first transmission signal to produce a second transmission signal, the phase relationship between said received first signal and said second signal being substantially the same as the phase relationship between said first transmission signal and said second transmission signal.

14. A coherent transponder comprising means for receiving a first carrier signal and a first subcarrier signal having a given frequency relationship to each other, a first phase tracking loop comprising means for adding said received first signal with a first injected reference signal ahead of all phase varying stages, said first injected reference signal differing from said received first carrier signal by an offset frequency, first voltage controlled oscillator means responsive in part to the phase of said received first signal for both generating said first injected reference signal and a second carrier signal, a second phase tracking loop comprising means for adding said first carrier signal with a second injected reference signal before amplification or detection, said second injected reference signal differing from said first subcarrier signal by said offset frequency, and a second voltage controlled oscillator means controlled in part by the phase of said first subcarrier signal for modulating both said first injected reference signal to produce said second injected reference signal and said second carrier signal to produce a second subcarrier signal, the phase relationship between said first carrier and first subcarrier signals being substantially the same as the phase relationship between said second carrier and said second subcarrier signals.

15. A coherent transponder comprising means for receiving a first carrier X-band signal and a 4 mc. modulating subcarrier signal, a carrier phase tracking loop comprising means for combining said carrier signal with a first injected reference signal 32 kc. removed from said first carrier signal, first voltage controlled oscillator means responsive in part to the phase of said first carrier signal for generating said first injected reference signal and a second carrier signal, a subcarrier phase tracking loop comprising means for combining said modulated subcarrier signal with a second injected reference 32 kc. removed from said subcarrier signal, and a substantially 4 mc. voltage controlled oscillator means controlled in part by the phase of said subcarrier for modulating both said first injected reference signal to produce said second injected reference signal and said second carrier signal to produce a 4 mc. modulating subcarrier signal, the phase relationship between said first carrier and subcarrier signal being substantially the same as the phase relationship between said second carrier and subcarrier signal.

References Cited by the Examiner

UNITED STATES PATENTS

| | | | |
|---|---|---|---|
| 2,528,119 | 10/1950 | Crosby | 343—6.5 |
| 2,705,320 | 3/1955 | Palmer | 343—12 |
| 3,025,520 | 3/1962 | Werner et al. | 343—10 |

OTHER REFERENCES

Reveal Doppler Tracking for Guided Missiles, in Aviation Week, September 15, 1957, pp. 28–30.

CHESTER L. JUSTUS, *Primary Examiner.*

R. E. KLEIN, P. M. HINDERSTEIN,
*Assistant Examiners.*